(12) United States Patent
Suzuki (10) Patent No.: US 6,386,805 B1
(45) Date of Patent: May 14, 2002

(54) SUCTION TABLE APPARATUS FOR A NUMERICAL CONTROL MACHINE

(75) Inventor: Yukitomo Suzuki, Hamamatsu (JP)

(73) Assignee: Heian Corporation, Shizuoka-ken (JP)

( * ) Notice: Subject to any disclaimer, the term of this patent is extended or adjusted under 35 U.S.C. 154(b) by 0 days.

(21) Appl. No.: 09/616,268

(22) Filed: Jul. 14, 2000

(30) Foreign Application Priority Data

Dec. 20, 1999 (JP) .......................................... 11-361887

(51) Int. Cl.$^7$ ............................. B23Q 1/25; B25B 11/00
(52) U.S. Cl. ........................ 409/163; 269/21; 269/266; 269/304; 408/76; 409/197; 409/218; 409/225
(58) Field of Search ............................. 144/286.5, 287; 408/76, 91; 409/163, 197, 218, 227, 225, 903; 269/21, 266, 303, 304

(56) References Cited

U.S. PATENT DOCUMENTS

| | | | | |
|---|---|---|---|---|
| 4,088,312 A | * | 5/1978 | Frosch et al. .................. | 269/21 |
| 4,640,501 A | * | 2/1987 | Poland .......................... | 269/21 |
| 4,684,113 A | * | 8/1987 | Douglas et al. ............... | 269/21 |
| 4,723,766 A | * | 2/1988 | Beeding ....................... | 269/21 |
| 4,838,531 A | * | 6/1989 | Corsi ........................... | 269/21 |
| 5,996,656 A | * | 12/1999 | Fezer ........................... | 269/21 |

FOREIGN PATENT DOCUMENTS

| | | | | | |
|---|---|---|---|---|---|
| FR | 2463631 A | * | 4/1981 | ................... | 269/21 |
| JP | 253779 A | * | 10/1993 | ................... | 269/21 |

* cited by examiner

*Primary Examiner*—Daniel W. Howell
(74) *Attorney, Agent, or Firm*—Richard M. Goldberg (57) ABSTRACT

Long support members are mounted on a table and are moved in the direction of a width of the table, rule stopper frames and pad frames are moved on long support members, such that a rectangular process board or a process board having a curved edge are positioned and held by suction on suction pads on the long support members.

4 Claims, 9 Drawing Sheets

SUCTION TABLE APPARATUS FOR A NUMERICAL CONTROL MACHINE

BACKGROUND OF THE INVENTION

The present invention relates to a suction table apparatus for a numerical control machine in which a process board having a curved edge is sucked on pads by being positioned against rule stoppers.

In the prior art, there is provided a numerical control router in which a head structure having plural heads is moved by a servomotor along rails attached to a front side of a cross beam on the upper portion of a base member. Plural movement frames are respectively moved and positioned by a servomotor in parallel on a table frame. Plural movement pad frames are mounted to move on the movement frames, respectively, by a servomotor, and suction pads are respectively mounted on the movement pad frames to move up and down by cylinders, whereby the movement frames and the movement pad frames are positioned in predetermined spaces, respectively.

However, in the numerical control machine in the prior art, though a rectagular process board can be positioned on the suction pads on the table frame to be processed, a process board having a curved edge can not be positioned on the suction pad on the table frame.

SUMMARY OF THE INVENTION

It is, therefore, the primary object of the present invention to provide a suction table apparatus for a numerical control machine in which the rule stopper frames and pad frames are respectively mounted to move on long support members, whereby a rectangular process board and a process board having a curved edge can be positioned and sucked on the suction pads.

In order to accomplish the above and other objects, the present invention comprises a plurality of long support members mounted in be moved to a width direction of a table, rule stopper frames are mounted to be moved along the long support members, respectively, near one end thereof, rule stoppers are respectively attached to up and down cylinders mounted on the rule stopper frames, respectively, pad frames are mounted to be moved along the long support members in spaces adjacent the rule stopper frames, respectively, and suction pads, respectively, are attached to up and down cylinders mounted on each of the pad frames.

DESCRIPTION OF THE PREFERRED EMBODIMENTS

Figure 1:
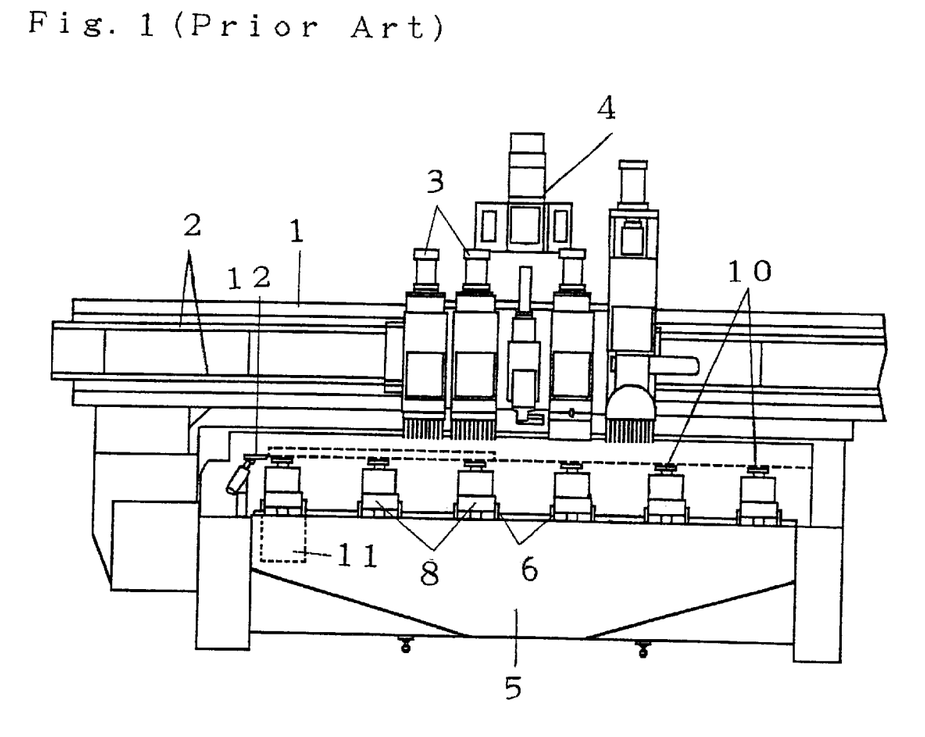
FIG. 1 shows a front elevational view of a numerical control machine provided by the applicant.
Figure 2:
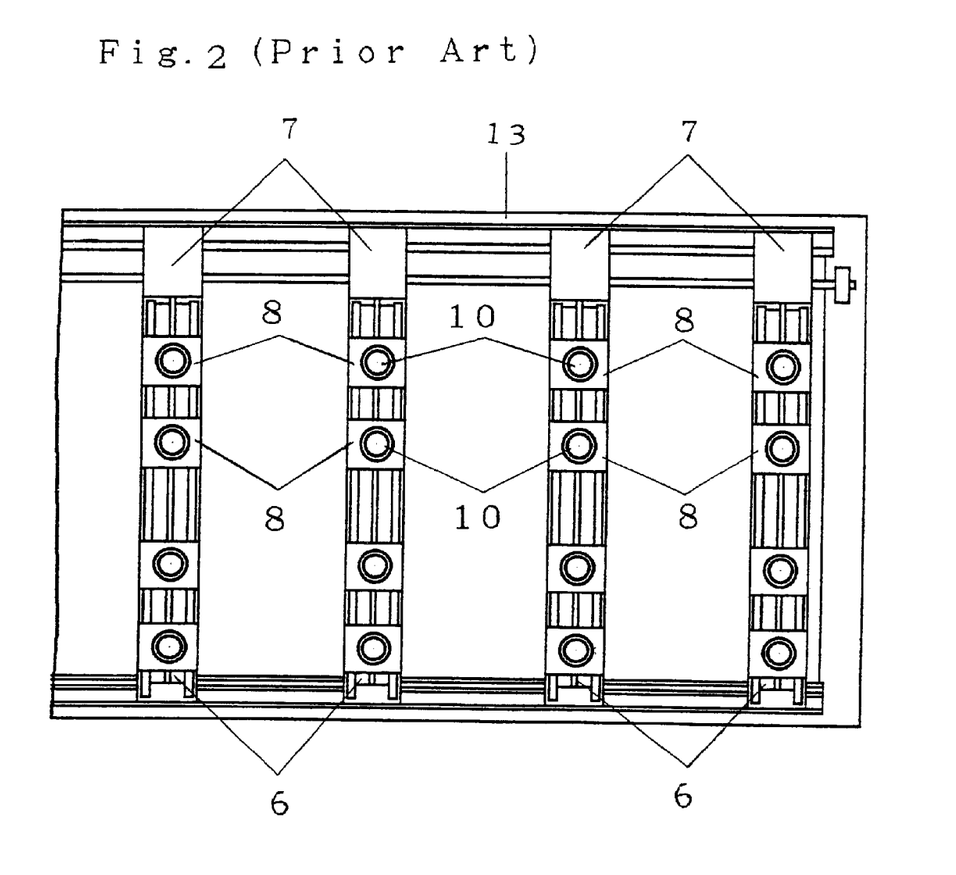
FIG. 2 shows a top plan view of a suction table of the numerical control machine in FIG. 1.
Figure 3:
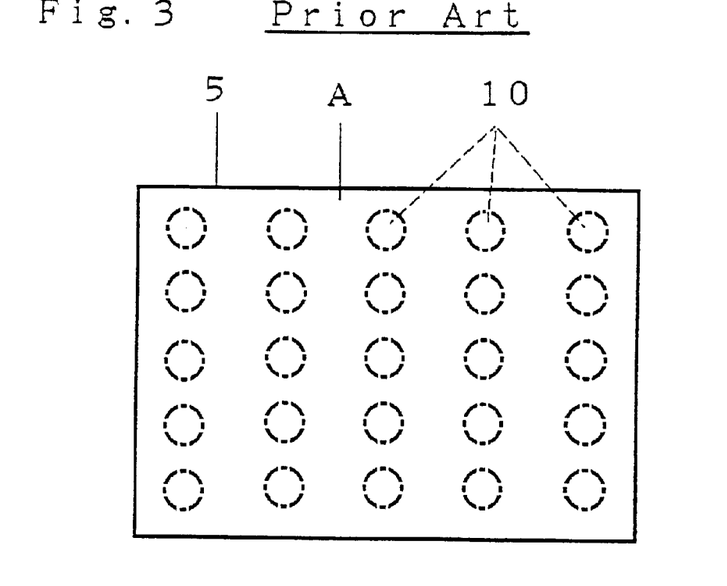
FIG. 3 shows a top plan view of the suction table of FIG. 1 on which a large process board is held by suction.
Figure 4:
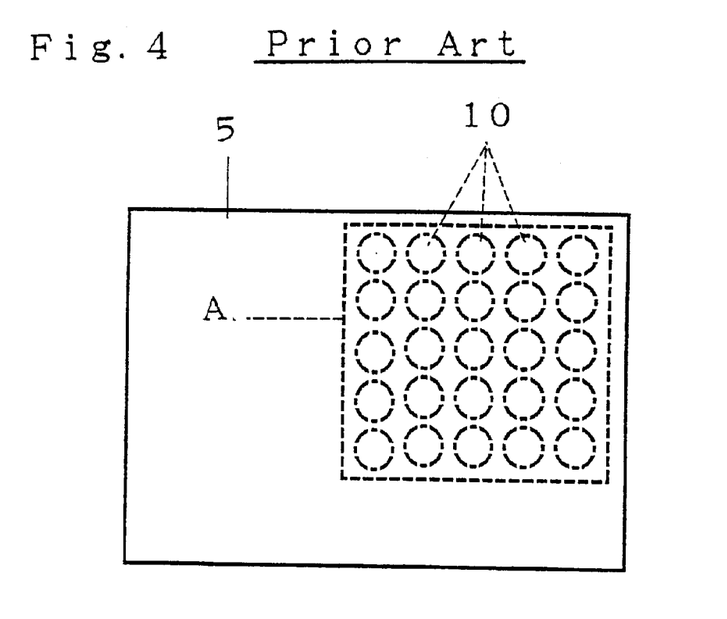
FIG. 4 shows a top plan view of the suction table of FIG. 1 on which a small process board is held by suction.
Figure 5:
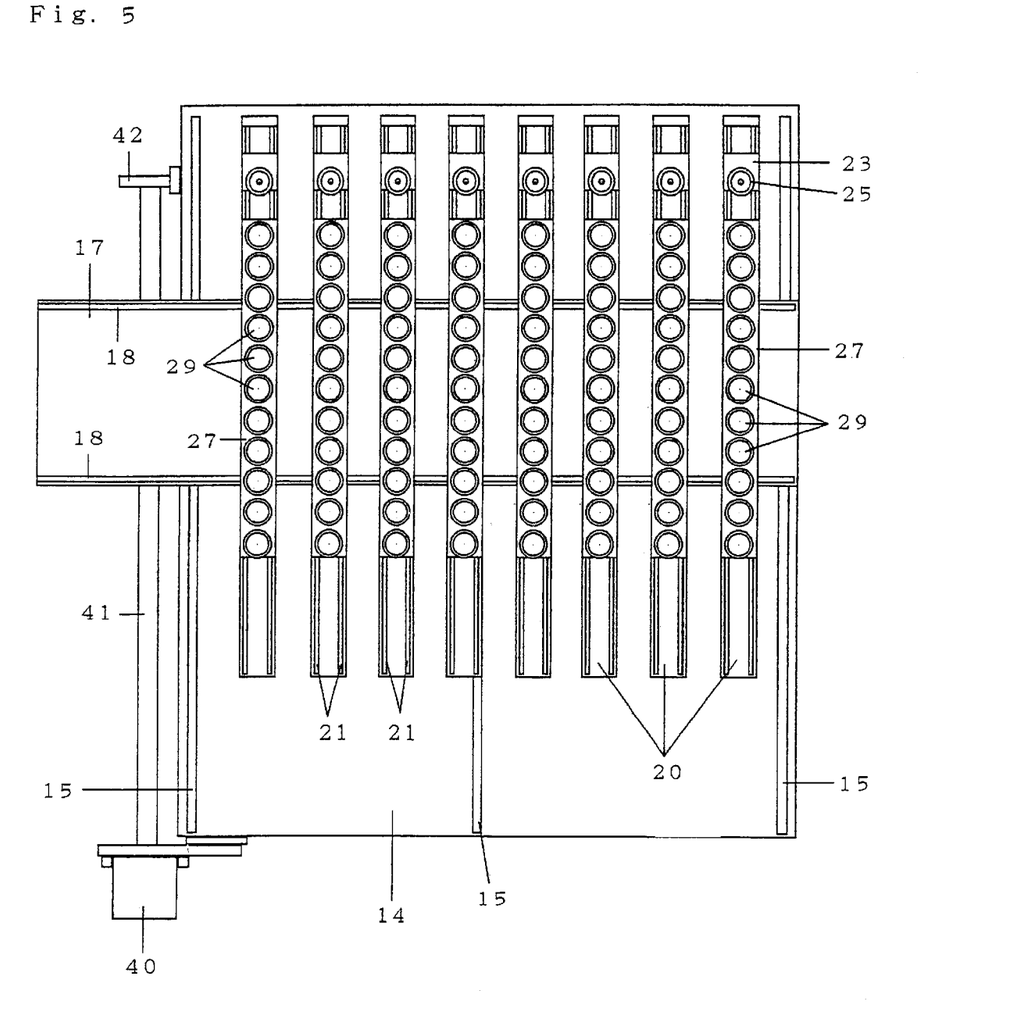
FIG. 5 shows a top plan view of a suction table apparatus for a numerical control machine according to an embodiment of the present invention.
Figure 6:
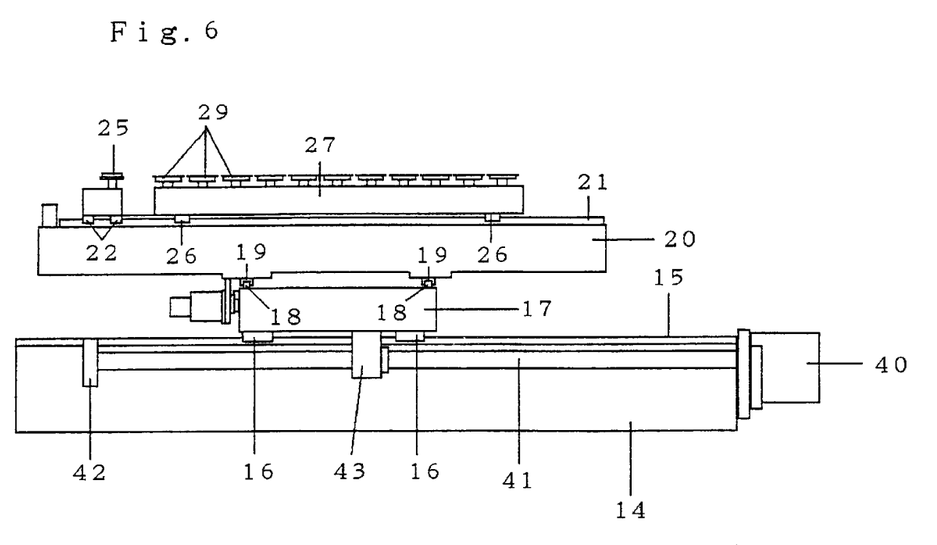
FIG. 6 shows a side view of the suction table apparatus for the numerical control machine shown in FIG. 5.
Figure 7:
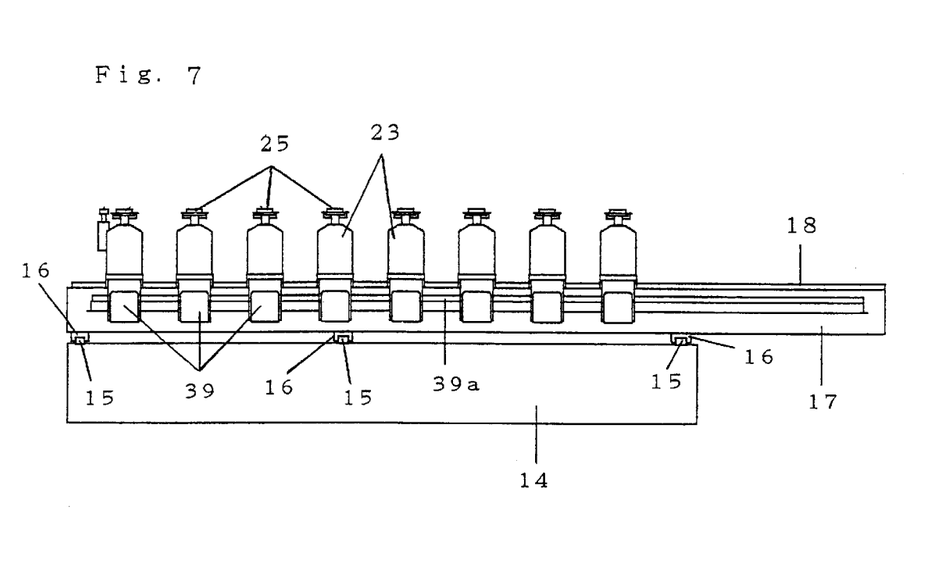
FIG. 7 shows a rear view of the suction table apparatus shown in FIG. 5.

The applicant has provided numerical control machine (see Japanese Patent Opening No. 6-43044) shown in FIGS. 1 and 2 in which a head structure 4 having plural heads 3 is moved by a servomotor along rails 2 attached to the front of a base frame 1, a table 5 is moved by a servomotor to cross to the moving direction of the head structure 4, plural moving racks 6 are mounted in parallel to be moved on the table 5, plural moving pad racks 8 are mounted to be moved on the moving racks respectively, plural suction pads 10 are attached to plural up and down cylinders mounted on the moving pad racks 8 respectively, and the moving racks 8 are respectively positioned by servomotors 11, whereby the spaces between the moving racks 6 and the moving pad racks 8 are regulated in predetermined values. Also, rule stoppers 12 and 13 are provided at the ends of the table 5.

However, in the numerical control machine in the prior art, though a rectagular process board a can be positioned on the suction pads on the table 5 to be processed, a process board having a curved edge can not be positioned on the suction pad on the table frame.

Referring to FIGS. 5, 6, 7 and 8, there is shown an embodiment of the present invention in which rails 15 are mounted on a base 14, and bearings 16 engaged with the rails 15 are attached to the lower part of a table 17. Also, rails 18 are mounted on the table 17, and bearings 19 engaged with the rails 18 are attached to the lower parts of plural long support members 20 respectively. Rails 21 are respectively mounted on the long support members 20, bearings 22 engaged with the rails 21 are respectively attached to rule stopper frames 23, and up and down cylinders 24 attaching rule stoppers 25 are mounted on the rule stopper frames 23.

Bearings 26 mounted under pad frames 27 are engaged with rails 21 on the long support member 20 in a space adjacent the rule stopper members 23, respectively, a plurality of up and down cylinders 28 are respectively mounted on the pad frames 27, and suction pads 29 are respectively attached to the moving shafts of the up down cylinders 28.

Figure 8:
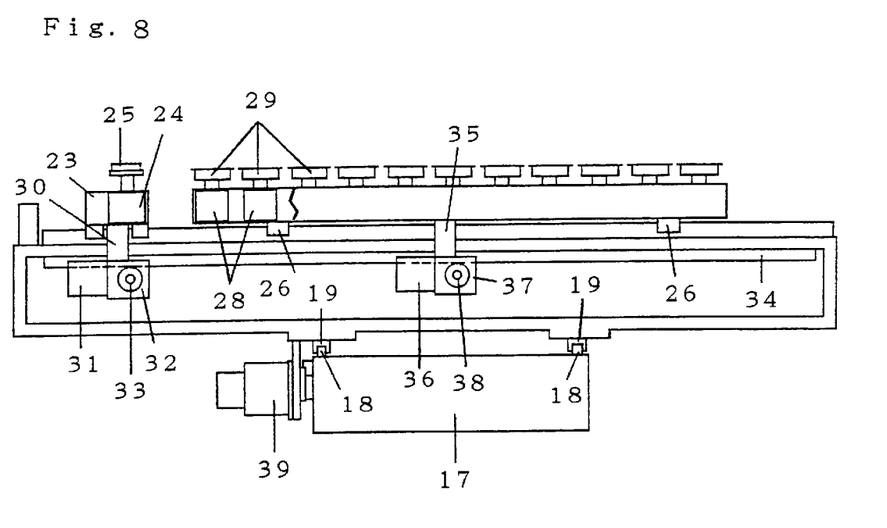
FIG. 8 shows a sectional view of the suction table apparatus shown in FIG. 5.

Connecting members 30 are projected under the rule stopper frames 23, rule stopper moving servomotors 31 and gear boxes 32 are respectively mounted to the connecting members 30 as shown in FIG. 8, and pinions 33 on fixed shafts of the gear boxes 32 are engaged with racks 34, respectively.

Connecting members 35 are projected under the pad frames 27. Pad moving servomotors 36 and gear boxes 37 are respectively mounted to the connecting members 35 as shown in FIG. 8, and pinions 38 on fixed shafts of the gear boxes 37 are engaged with racks 34, respectively.

Long support member moving servomotors 39 are respectively mounted on the ends of long support members 20, and pinions (not shown) respectively fixed to the long support member moving servomotors 39 are engaged with a rack mounted on the table 17, whereby the long support members 20 are moved by the long support member moving servomotors 39.

A table moving servomotor 40 is mounted on the end of the base 14, an end of screw shaft 41 being connected to the rotary shaft of the table moving servomotor 40, the other end of the screw shaft 41 being supported to move by a support member 42, and a connecting member 43 projecting under the table 17 is engaged with the screw shaft 41.

Figure 9:
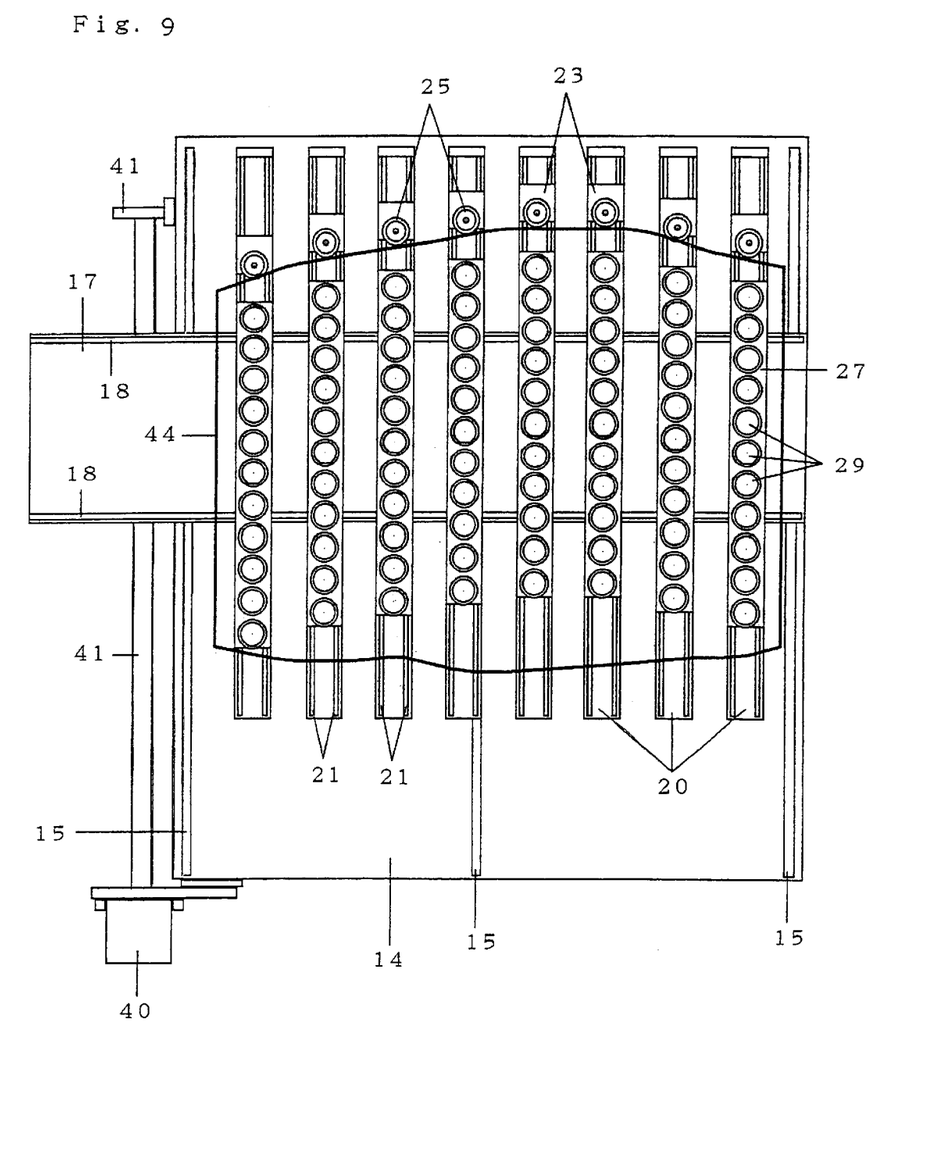
FIG. 9 shows a top plan view on which a process board is mounted on the suction table apparatus shown in FIG. 5.

In the suction table apparatus in the present embodiment, as shown in FIG. 9, if one edge of a process board 44 is curved, the long support members 20 are moved and positioned according to the process board 44 by the support moving servomotors 39, the rule stopper frames 23 are moved and positioned according to the process board 44 by the rule stopper moving servomotors 31 and the pad frames 27 are moved and positioned according to the process board 44 by the pad moving servomotors 36.

Figure 10:
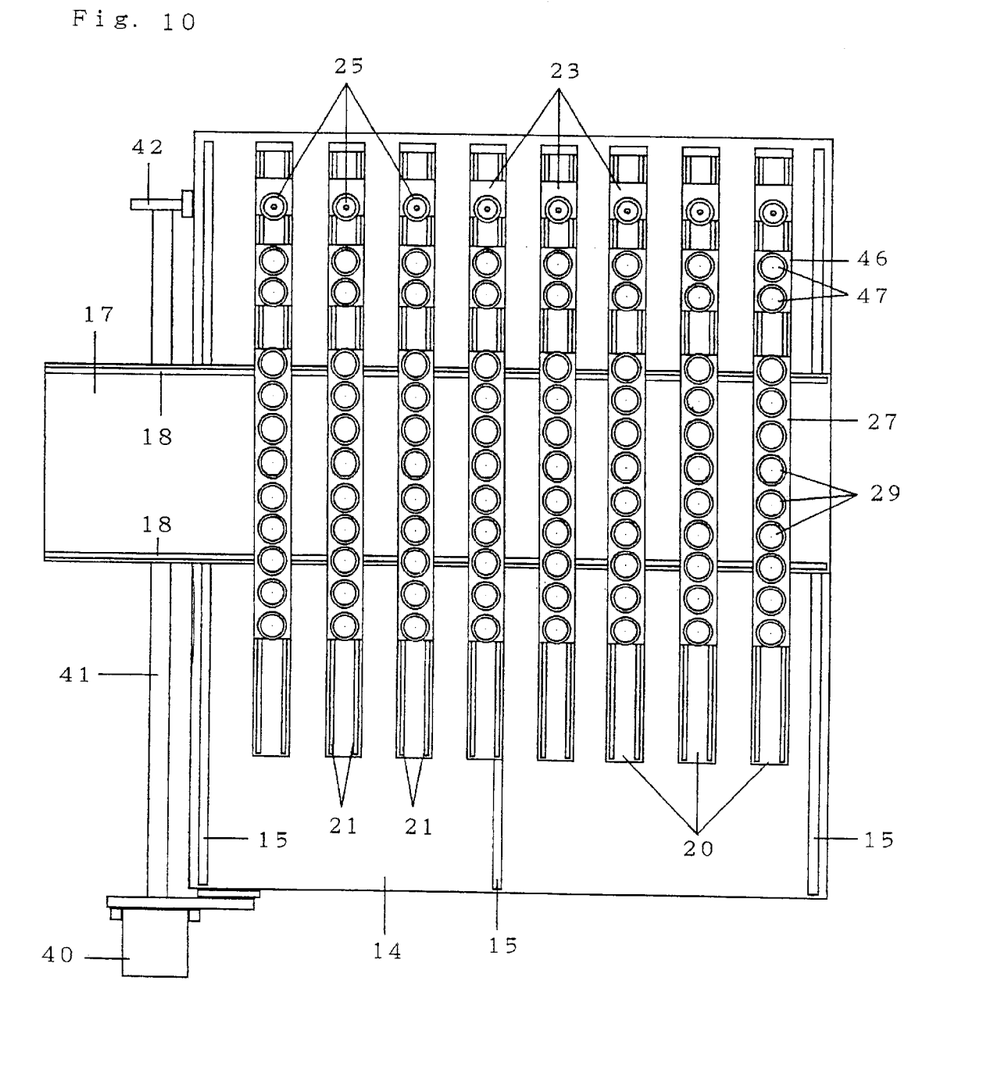
FIG. 10 shows a top plan view of a suction table apparatus for a numerical control machine according to another embodiment of the present invention.

Referring to FIG. 10, there is shown another embodiment of the invention which includes a base 14, rails 15, a table 17, rails 18, long support members 20, rails 21, rule stopper frames 23, rule stoppers 25, pad frames 27, suctions pads 29, a table moving servomotor 40, a screw shaft 41 and a support member 42. These elements are the same as in the above embodiment, and a detailed explanation of the these elements is omitted. In the present embodiment, second pad frames 46 mounting a few suction pads 47 are mounted to move on the long support members 20, respectively.

In this embodiment, when the edge of the process board 44 is not removed from the suction pads 29, by mounting the second pad frames 46 on the long support members 20 respectively, the spaces between the suction pads 29 become the same, and a process board 47 having a predetermined formation is optimally held by suction and the work efficiency is improved.

What is claimed is:

1. A suction table apparatus for a numerical control machine, comprising:

a plurality of long support members mounted to be moved in a widthwise direction of a table, rule stopper frames mounted to be moved along the long support members near one end thereof, first up and down cylinders mounted on the rule stopper frames, respectively, rule stoppers respectively attached to the up and down cylinder, pad frames mounted to be moved along the long support members in spaces adjacent the rule stopper frames, respectively, second up and down cylinders mounted on each of the pad frames, and a suction pad respectively attached to each second up and down cylinder.

2. A suction table apparatus for a numerical control machine as set forth in claim 1 further including a rule stopper moving servomotor associated with each rule stopper frame and a pad moving servomotor associated with each pad frame, and wherein the rule stopper frames and the pad frames are moved and positioned in accordance with the shape of a process board by the rule stopper moving servomotors and the pad moving servomotors.

3. A suction table apparatus for a numerical control machine as set forth in claim 1 further comprising support moving servomotors respectively mounted to the long support members.

4. A suction table apparatus for a numerical control machine as set forth claim 2 further comprising support moving servomotors respectively mounted to the long support members.

* * * * *